US009918127B2

(12) United States Patent
Hicks

(10) Patent No.: US 9,918,127 B2
(45) Date of Patent: *Mar. 13, 2018

(54) METHODS AND APPARATUS TO DETECT PEOPLE

(71) Applicant: The Nielsen Company (US), LLC, New York, NY (US)

(72) Inventor: Michael Alan Hicks, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,968

(22) Filed: Mar. 27, 2017

(65) Prior Publication Data

US 2017/0201795 A1   Jul. 13, 2017

Related U.S. Application Data

(63) Continuation of application No. 14/471,988, filed on Aug. 28, 2014, now Pat. No. 9,609,385.

(51) Int. Cl.
*H04N 21/442* (2011.01)
*H04N 21/4223* (2011.01)
*G06K 9/00* (2006.01)

(52) U.S. Cl.
CPC ... *H04N 21/44218* (2013.01); *H04N 21/4223* (2013.01); *G06K 9/00268* (2013.01)

(58) Field of Classification Search
CPC ................................................. H04N 21/44218
See application file for complete search history.

(56) References Cited

U.S. PATENT DOCUMENTS

| 6,888,457 | B2 * | 5/2005 | Wilkinson | ........... | A61B 5/0002 340/323 R |
| 8,542,878 | B2 | 9/2013 | Cennini et al. | | |
| 8,984,622 | B1 * | 3/2015 | Baldwin | ............ | G06K 9/00228 726/16 |
| 9,609,385 | B2 | 3/2017 | Hicks | | |

(Continued)

OTHER PUBLICATIONS

Teixeira et al., "A Survey of Human-Sensing Methods for Detecting Presence, Count, Location, Track, and Identity," received May 9, 2014, 35 pages.

(Continued)

*Primary Examiner* — Olugbenga Idowu
(74) *Attorney, Agent, or Firm* — Hanley, Flight & Zimmerman, LLC

(57) ABSTRACT

Methods and apparatus to detect people are disclosed. An example method includes detecting a first human pulse waveform in first light information associated with a first one of a plurality of segments of an environment, the light information obtained from a light sensor. Generating a first presence indication in response to respective light information associated with a threshold amount of the segments proximate the first one of the segments includes the first human pulse waveform identified in the first one of the segments. Identifying a first location associated with a face in the environment using thermal imaging data from a thermal sensor. Adjusting a people count in response to the first location associated with the face not corresponding to a second location associated with the first presence indication.

20 Claims, 8 Drawing Sheets

(56) References Cited

U.S. PATENT DOCUMENTS

| | | | | |
|---|---|---|---|---|
| 2010/0162285 | A1* | 6/2010 | Cohen | H04H 60/31 |
| | | | | 725/12 |
| 2012/0324492 | A1* | 12/2012 | Treadwell, III | H04H 60/45 |
| | | | | 725/10 |

OTHER PUBLICATIONS

Samardzija et al., "Applications of MIMO Techniques to Sensing of Cardiopulmonary Activity," received May 9, 2014, 4 pages.

Chandler, "Your vital signs, on camera," Oct. 4, 2010, 3 pages, MIT News Office.

Zhou et al., "Detection of Multiple Heartbeats Using Doppler Radar," IEEE 2006, 4 pages.

Quick, "Touchless heart rate monitor apps detect changes in face's reflectivity," Sep. 5, 2012, 5 pages, www.gizmag.com.

United States Patent and Trademark Office, "Non-Final Office Action," issued in connection with U.S. Appl. No. 14/471,988, dated Sep. 22, 2015, 23 pages.

United States Patent and Trademark Office, "Non-Final Office Action," issued in connection with U.S. Appl. No. 14/471,988, dated Feb. 10, 2016, 19 pages.

United States Patent and Trademark Office, "Final Office Action," issued in connection with U.S. Appl. No. 14/471,988, dated Jun. 30, 2016, 23 pages.

United States Patent and Trademark Office, "Notice of Allowance," issued in connection with U.S. Appl. No. 14/471,988, dated Nov. 18, 2016, 23 pages.

* cited by examiner

METHODS AND APPARATUS TO DETECT PEOPLE

CROSS REFERENCE TO RELATED APPLICATIONS

This patent arises from a continuation of U.S. patent application Ser. No. 14/471,988, filed Aug. 28, 2014, now U.S. Pat. No. 9,609,385, entitled "Methods and Apparatus to Detect People." U.S. patent application Ser. No. 14/471,988 is hereby incorporated herein by reference in its entirety.

FIELD OF THE DISCLOSURE

This disclosure relates generally to audience measurement and, more particularly, to methods and apparatus to detect people.

BACKGROUND

Audience measurement of media (e.g., content and/or advertisements, such as broadcast television and/or radio programs and/or advertisements, streaming media, stored audio and/or video programs and/or advertisements played back from a memory such as a digital video recorder or a digital video disc, audio and/or video programs and/or advertisements played via the Internet, video games, etc.) often involves collection of media identifying data (e.g., signature(s), fingerprint(s), code(s), channel information, time of presentation information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the collected people data includes an amount of people in a media exposure environment (e.g., a television room, a family room, a living room, a cafeteria at a place of business or lounge, a television viewing section of a store, restaurant, a bar, etc.). The calculated amount of people in the environment can be correlated with media being presented in the environment at the particular date and time to provide exposure data (e.g., ratings data) for that media.

DETAILED DESCRIPTION

Figure 1:
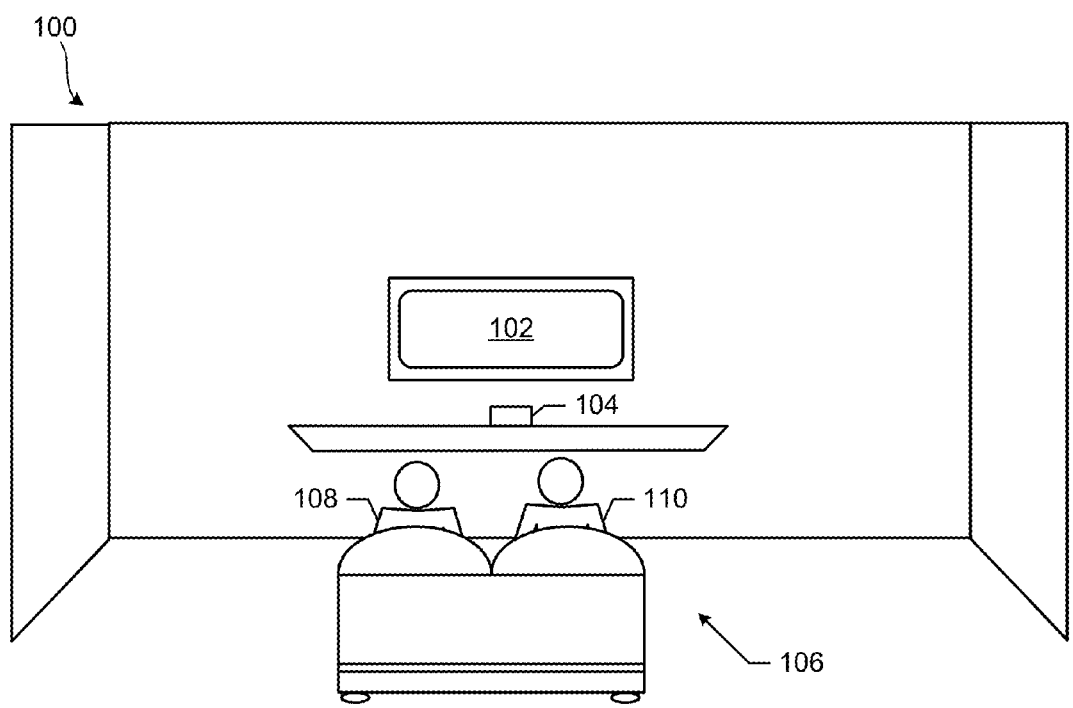
FIG. 1 is an illustration of an example media exposure environment including an example meter constructed in accordance with teachings of this disclosure.

In some audience measurement systems, people data is collected for a media exposure environment (e.g., a television room, a family room, a living room, a bar, a restaurant, an office space, a cafeteria, etc.) by capturing a series of images of the environment and analyzing the images to determine, for example, an identity of one or more persons present in the media exposure environment, an amount of people present in the media exposure environment during one or more times and/or periods of time, an amount of attention being paid to a media presentation by one or more persons, a gesture made by a person in the media exposure environment, etc. The people data can be correlated with, for example, media identifying information corresponding to detected media to provide exposure data for that media. For example, an audience measurement entity (e.g., The Nielsen Company (US), LLC) can calculate ratings for a first piece of media (e.g., a television program) by correlating media exposure data collected from a plurality of panelist sites with the demographics of the panelists. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of an audience (e.g., an entire population, a demographic segment, etc.) exposed to the media.

To generate the people data, some systems attempt to recognize objects as humans in image data representative of the monitored environment. In such systems, a tally is maintained for each frame of image data to reflect an amount of people in the environment at a particular time. However, image data processing is computationally expensive and has drawbacks, such as false positives. For example, a non-human object, such as a picture of a human face hanging on a wall, is sometimes mistaken for a human face, thereby improperly inflating the person/audience tally for the corresponding frame. These and other limitations and/or inaccuracies can lead to an inaccurate tally of people for individual frames. An inaccurate tally of people in a frame can negatively affect the accuracy of media exposure data generated using the tally. For example, a meter counting the people in a room may also be collecting media identifying information to identify media being presented (e.g., aurally and/or visually) in the room. With the identification of the media and the amount of people in the room at a given date and time, the meter can indicate how many people were exposed to the specific media and/or associate the demographics of the people with the media to determine audience characteristics for the specific media. When person(s) are not detected or recognized as people, the exposure data for the identified media may be undercut (e.g., the media is accredited with less viewers/listeners than had actually been exposed to the media). Alternatively, when false positives are detected, the exposure data for the identified media may be overstated (e.g., the media is accredited with more viewers/listeners than had actually been exposed to the media). Additionally, systems that capture image data may raise privacy concerns for some.

Example methods, apparatus, and articles of manufacture disclosed herein detect people in an environment in an efficient, accurate and private manner that avoids drawbacks of known image data recognition systems, such as computationally expensive image processing person recognition algorithms and costly types of image capture equipment. Examples disclosed herein collect light information for a plurality of defined segments of an environment (e.g., a living room including a media presentation device such as a television and/or audio). Examples disclosed herein recognize that people are typically horizontally arranged (e.g., sitting across furniture) in the environment, rather than vertically. Accordingly, examples disclosed herein divide the environment into a plurality of vertical segments or strips and collect the light information for each of the segments. In some examples, the light information includes an aggregate brightness value for the corresponding segment for a first time.

Examples disclosed herein collect sequences of the light information over periods of time. Thus, in some examples, light information gathered for each segment includes a sequence of brightness values. In some examples disclosed herein, the light information is collected via an array of light sensors arranged horizontally behind a light guide (e.g., a lens). In some examples disclosed herein, each of the light sensors corresponds to one of the defined segments of the environment. In some examples disclosed herein, the light guide directs light from each of the segments of the environment to the respective ones of the light sensors. While examples disclosed herein are described below as collecting the light information via an array of light sensors, additional or alternative collection techniques and/or equipment can be used. For example, two-dimensional image data representative of the environment can be captured and brightness information for each of a plurality of segments can be obtained from the image data.

Examples disclosed herein analyze the light information for each segment over a period of time (e.g., a brightness value sequence) to determine whether the light information is indicative of a person being present in the segment. Examples disclosed herein determine whether the light information of a particular segment over the period of time includes a pattern indicative of a human pulse. That is, examples disclosed herein determine whether a brightness value sequence includes a pulse-indicative pattern. A face of a person varies in brightness due to pulse-driven blood flow. The pulse of a person, especially while at rest (e.g., watching television) has a pattern. Thus, the variance in brightness of a face includes a pattern that corresponds to the pulse-driven blood flow. Examples disclosed herein analyze the light information to detect such a pattern. That is, examples disclosed herein analyze light information corresponding to a segment to determine whether that particular segment includes a pattern having a characteristic indicative of a person being present in a portion of the environment associated with that segment. Put another way, examples disclosed herein determine if a pulse-indicative pattern is present in the light information corresponding to the segment. Examples disclosed herein record one or more aspects of the detected pulse-indicative pattern such as, for example, a rate (e.g., beats per minute) and/or one or more brightness values (e.g., a maximum detected brightness of the sequence, a minimum detected brightness of the sequence, an average variance in brightness across the sequence, an average difference between peaks and values of the sequence, etc.). When a pulse-indicative pattern is detected in the light information associated with a particular segment, examples disclosed herein determine whether nearby segments also include a pulse-indicative pattern that is similar to the pattern detected in the particular segment (e.g., by comparing the recorded aspects or characteristics of the pattern, such as rate and/or one or more brightness values). Nearby segments or neighboring segments or proximate segments are those segments within a threshold distance of each other and/or within a threshold number of segments from each other. Examples disclosed herein determine that a person is present in an area corresponding to the segment when a threshold number of proximate segments (e.g., neighbors) include a similar (e.g., having a similar rate and/or being in sync) pulse-indicative pattern. As different people are unlikely to have the same pulse and even less likely to have the same pulse synchronized together, examples disclosed herein can detect multiple people in the environment. Notably, when an array of light sensors is used to obtain the light information, examples disclosed herein are able to detect a number of people in the environment while maintaining the privacy of the people and without having to perform computationally expensive image recognition algorithms. That is, in some examples disclosed herein, the array of light sensors is incapable of obtaining an identity of the detected people, thereby detected presence of people in a unobtrusive manner, FIG. 1 is an illustration of an example media exposure environment 100 including an information presentation device 102, an example meter 104, and an audience 106 including a first person 108 and a second person 110. In the illustrated example of FIG. 1, the information presentation device 102 is a television and the media exposure environment 100 is a room of a household (e.g., a room in a home of a panelist such as the home of a "Nielsen family") that has been statistically selected to develop television ratings data for population(s)/demographic(s) of interest. In the illustrated example of FIG. 1, one or more persons of the household have registered with an audience measurement entity (e.g., by agreeing to be a panelist) and have provided demographic information to the audience measurement entity as part of a registration process to enable associating demographics with viewing activities (e.g., media exposure). The example meter 104 of FIG. 1 can be implemented in additional and/or alternative types of environments such as, for example, a room in a non-statistically selected household, a theater, a restaurant, a tavern, a retail location, an arena, etc. In some examples, the example meter 104 of FIG. 1 is implemented, at least in part, in connection with additional and/or alternative types of media presentation devices such as, for example, a radio, a computer, a tablet (e.g., an iPad®), a cellular telephone, and/or any other communication device able to present media to one or more individuals.

In some examples, the meter 104 of FIG. 1 is software installed in consumer electronics associated with the environment 100 such as, for example, a set-top box, a BluRay disc play, and/or a video game system (e.g., an XBOX® having a Kinect® sensor). In such instances, the example meter 104 of FIG. 1 is, for example, downloaded from a network, installed at the time of manufacture, installed via a port (e.g., a universal serial bus (USB) port receiving a jump drive provided by the audience measurement company), installed from a storage disc (e.g., an optical disc such as a BluRay disc, Digital Versatile Disc (DVD) or CD (compact Disk), and/or any other suitable manner of installation. Executing the meter 104 on equipment associated with (e.g., owned by) one or more panelists is advantageous in that costs of installation are reduced by relieving the audience measurement entity of the need to supply hardware to the monitored household. In some examples, the meter 104 is integrated with the consumer electronics (e.g., by the manufacturer prior to sale to the consumer). That is, in some examples, the consumer electronics into which the meter 104 is integrated may be repurposed and/or data collected by the consumer electronics may be repurposed for audience measurement. For example, the meter 104 may obtain light information (e.g., direct brightness values from an array of light sensors and/or brightness values extracted from image data) from one or more sensors of a video game system and/or may also collect such light information from internal sensor(s). In some examples, rather than installing the meter 104 on the consumer electronics of the panelist(s), the example meter 104 of FIG. 1 is a dedicated audience measurement unit provided by the audience measurement entity. In such examples, the meter 104 may include its own housing, processor, memory and software to perform the desired audience measurement functions. In some examples, the dedicated meter 104 is adapted to communicate with (e.g., via a wired and/or wireless connection), for example, information capturing devices implemented in the environment 100 such as, for example, a video game system having image capturing equipment. In some examples, the communications are effected via the consumer electronics of the panelist (e.g., via a video game console). In some examples, the meter 104 includes information collection device(s), such as a light sensor array, an image capturing device, and/or audio sensors and, thus, no direct interaction (outside of monitoring outputs) with the consumer electronics owned by the panelist is involved. As disclosed below in connection with FIGS. 2 and 3, the example meter 104 of FIG. 1 uses light information (e.g., brightness value sequences) representative of the environment 100 to detect people (e.g., the first and second persons 108, 100). In some examples, the example meter 104 of FIG. 1 correlates the people detection information with media identifying information collected from the environment 100. In some examples, the correlation is done by another device such as a remote data collection server. Thus, the example meter 104 of FIG. 1 generates audience measurement data (e.g., exposure information for particular media) for the environment 100.

Figure 2:
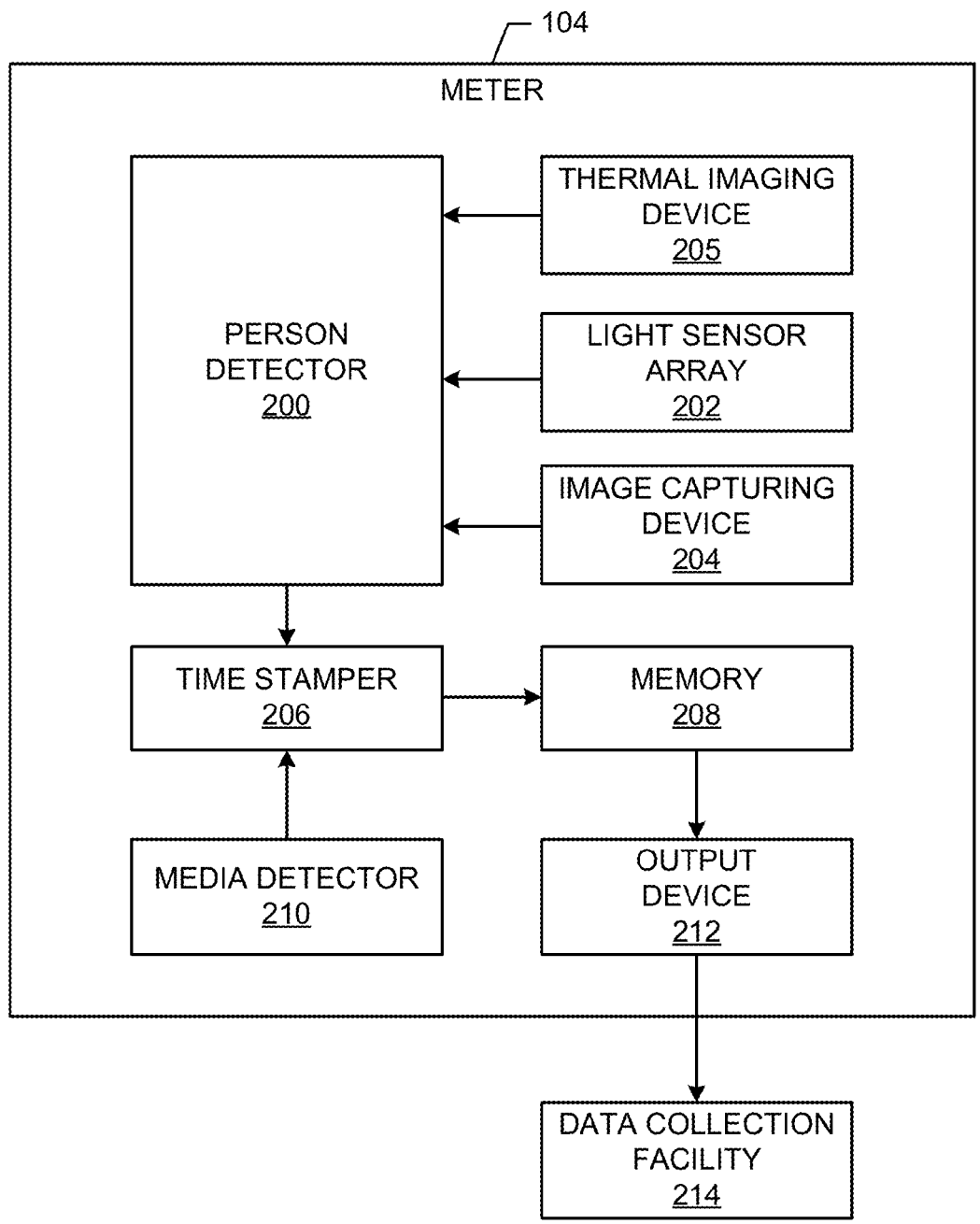
FIG. 2 is a block diagram of an example implementation of the example meter of FIG. 1.
Figure 4:
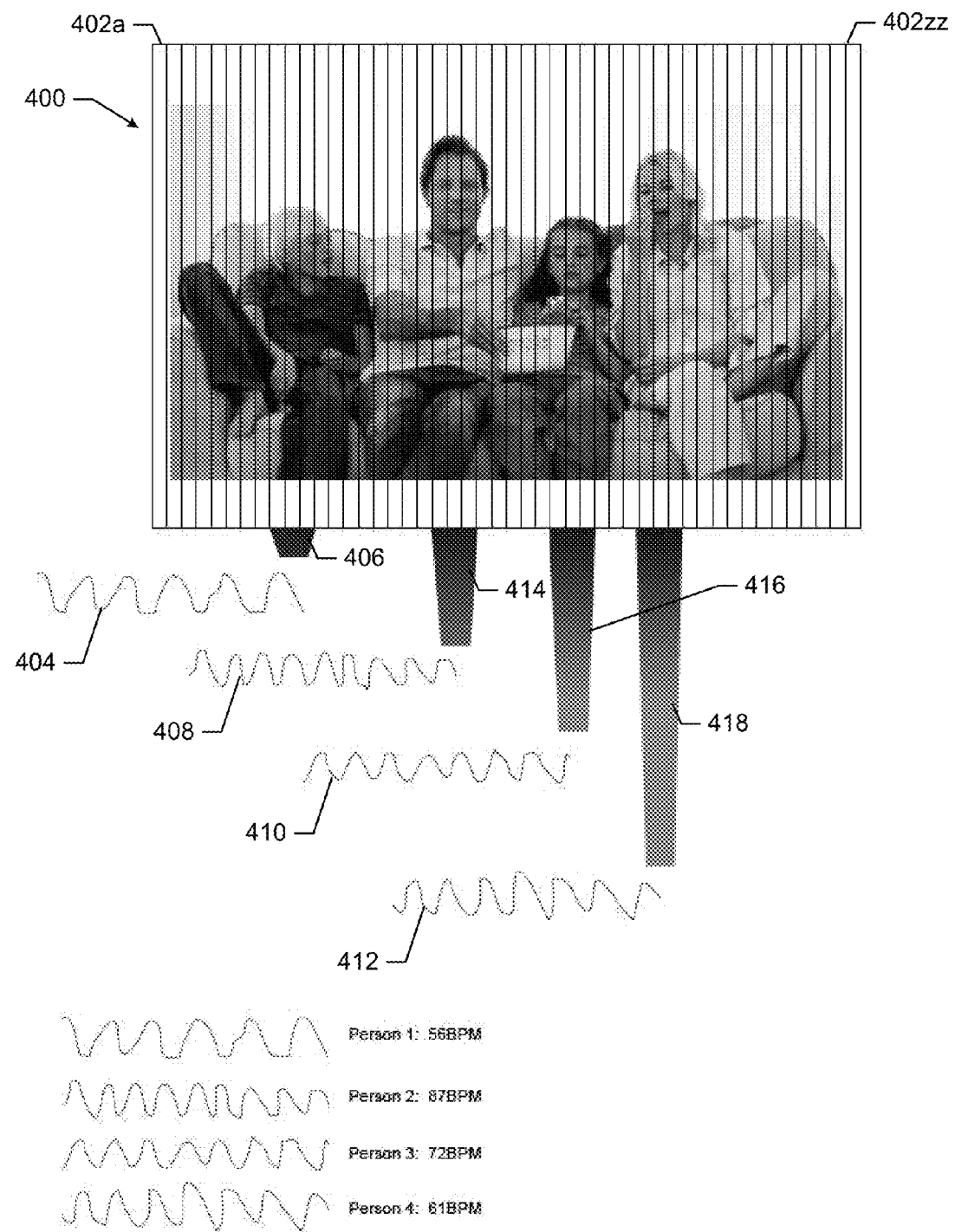
FIG. 4 is an illustration of an example segmentation of the example media exposure environment of FIG. 1 implemented by the example meter of FIGS. 1 and/or 2.

In the illustrated example of FIG. 1, the meter 104 is placed adjacent the information presentation device 102 at a position for capturing light information associated with the environment 100. While the meter 104 is positioned beneath the information presentation device 102 in the example of FIG. 1, the meter 104 can be located at alternative locations (e.g., above the information presentation device 102, mounted to a wall at a side of the information presentation device 102, etc.). The example meter 104 of FIG. 1 is a stationary apparatus in that the meter 104 is positioned at a set location (e.g., on a shelf, on top of a media cabinet, etc.) and meant to remain in that location when capturing light information. That is, the example meter 104 of FIG. 1 is not meant for mobile usage by, for example, picking up the meter 104 and capturing data while moving the meter 104 around. FIG. 2 illustrates an example implementation of the meter 104 of FIG. 1. The example meter 104 of FIG. 2 includes a person detector 200 to detect one or more persons in, for example, the media exposure environment 100 of FIG. 1. The example person detector 200 of FIG. 2 obtains light information associated with the media exposure environment via a light sensor array 202 of the example meter 104. In some examples, the light sensor array 202 is implemented within a housing of the meter 104 (and/or a housing of an electronic component with which the meter 104 is integrated, such as a video game console). Additionally or alternatively, the example light sensor array 202 may be a physically separate component in communication with the example meter 104. In the illustrated example of FIG. 2, the light sensor array 202 is implemented by a horizontally arranged row of light sensors implemented behind a light guide (e.g., a lens). For example, the light sensor array 202 may be a linear group of Contact Image Sensors (CISs) arranged behind a light guide (e.g., a lens). In such examples, the light guide focuses light from a first portion of the environment 100 onto a first one of the sensors of the array 202, light from a second, different portion of the environment 100 onto a second one of the sensors of the array 202, light from a third, different portion of the environment 100 onto a third one of the sensors of the array 202, etc. In some examples, the light gathered by individual ones of the sensors of the array 202 represents a cumulative value corresponding to an aggregate of the light present in the corresponding segment or region of the environment 100. As the sensors of the array 202 are arranged horizontally, the example light sensor array 202 provides light information for each of a plurality of substantially vertical (e.g., plus or minus one degree from vertical) strips or segments of the environment 100 spanning horizontally across a portion of the environment 100 to be monitored. An example implementation of the segments provided by the arrangement of the example light sensor array 202 is shown in FIG. 4 and discussed below in connection with FIG. 4.

The example meter 104 of FIG. 2 includes an image capturing device 204 to capture, for example, two-dimensional image data representative of the media exposure environment 100 from which light information may be extracted. In some examples, the image capturing device 204 of FIG. 2 is implemented within the housing of the meter 104 (and/or the housing of an electronic component with which the meter 104 is integrated, such as a video game console). Additionally or alternatively, the example image capturing device 204 may be implemented as physically separate from the component in which the meter 104 is implemented (e.g., the array may be a sensor such as a Kinnect® sensor of an XBOX® system). In some examples, the meter 104 includes and/or communicates with only one of the light sensor array 202 and the image capturing device 204. The example image capturing device 204 of FIG. 2 is implemented by a sensor that captures two-dimensional image data representative of the environment 100. In some examples, the two-dimensional sensor 506 includes an infrared imager, a complimentary metal-oxide semiconductor (CMOS) camera, and/or a charge coupled device (CCD) camera. In some examples, the image data captured by the image capturing device 204 is used to identify a person via, for example, any suitable facial recognition technique and/or application.

The example meter 104 of FIG. 2 includes a thermal imaging device 205 to gather temperature values of surfaces in the environment 100. In the illustrated example of FIG. 2, the thermal imaging device 205 is implemented by any suitable device capable of determining a temperature of a surface such as, for example, a forward looking infrared (FLIR) camera. The example thermal imaging device 205 of FIG. 2 detects, for example, different magnitudes of thermal radiation emitted by, for example, a person. Thus, the example thermal imaging device 205 detects a first temperature of a surface of clothing and a second different temperature of a surface of human skin. In the example of FIG. 2, the thermal imaging device 205 is sensitive enough to detect a difference between the temperature of a surface of a person's face and the temperature(s) of surfaces of the person's non-face body parts. Because certain blood vessels of the human face are closer to the surface of the skin compared to, for example, an arm or a leg, the surface of a person's face is typically warmer than other surfaces of the body under similar conditions of the face (e.g., exposed to air or unclothed). The example thermal imaging device 205 of FIG. 2 has a resolution (e.g., 0.1 degrees F.) great enough to detect these differences. Accordingly, measurements taken by the example thermal imaging device 205 of FIG. 2 can be used to distinguish, for example, a face from a non-face body part.

In some examples, the light sensor array 202, the image capturing device 204, and/or the thermal imaging device 205 only capture data when the information presentation device 102 is in an "on" state and/or when the meter 104 determines that media is being presented in the environment 100 of FIG. 1.

As disclosed in detail below in connection with FIG. 3, the example person detector 200 of FIG. 2 uses the obtained light information (e.g., brightness sequence values) to generate a people count corresponding to a configurable time period (e.g., one minute intervals, thirty second intervals, etc.) for the imaged portion of the example environment 100 of FIG. 1. In particular, the example person detector 200 of FIG. 2 breaks the example environment 100 of FIG. 1 into discrete segments (e.g., vertical strips) and determines whether individual ones of the segments includes a pattern of light values over time corresponding to an effect that a pulse or heartbeat has on skin of a person. Put another way, the example person detector 200 of FIG. 2 uses light information associated with the environment 100 to detect pulse(s) of person(s) present in the environment 100. When the example person detector 200 of FIG. 2 detects a pulse in one of the defined segments of the environment 100, the example person detector 200 tests neighboring segments (e.g., segments adjacent and/or proximate to each other within a threshold) to determine whether the neighbor segments include a similar pattern. That is, the example person detector 200 of FIG. 2 determines whether the same pulse is detected in neighboring segments. When a threshold number of the neighboring segments include the same pulse-indicative pattern in the respective light information, the example person detector 200 determines that a person is present in the environment 100 at a location corresponding to the segments. In some examples, the threshold number of neighboring segments corresponds to an expected size (e.g., a width and/or other dimension) of a face, body, and/or body part. The number of person detections using the light information and the pulse-indicative patterns for a particular period of time is referred to herein as the pulse-based person count for that period of time.

In some examples, the person detector 200 of FIG. 2 uses data collected by the thermal imaging device 205 as a check or verification of the pulse-based person count. In some examples, the thermal imaging check or verification of the pulse-based person count is performed sporadically. For example, the thermal imaging check or verification of the pulse-based person count is performed according to a schedule (e.g., periodically) and/or in response to a change in the pulse-based count from one period of time to another period of time (e.g., when a person enters or leaves the environment 100). As described in detail below, the data provided by the thermal imaging device 205 is useful in verifying that, for example, the pulse-based person count does not include multiple person detections for a single person due to, for example, a non-face body part being mistaken for a face. That is, the pulse-based person count may include more than one person detection for a single person, which would inaccurately represent the actual number of people in the environment 100. As described below, the example person detector 200 of FIG. 2 uses the thermal imaging device 205 to ensure that such a double counting does not occur. When the example person detector 200 of FIG. 2 determines that the pulse-based person count is inaccurate (e.g., by determining that one of the pulse-based person detections corresponds to a hand rather than face), the example person detector 200 of FIG. 2 adjusts the pulse-based person count accordingly (e.g., by reducing the pulse-based person count). Additionally or alternatively, the data provided by the example thermal imaging device 205 may indicate that the pulse-based person count is less than an actual number of people present in the environment 100. For example, the number of faces detected in the data provided by the example thermal imaging device 205 may be greater than the pulse-based person count. In such instances, the example person detector 200 of FIG. 2 adjusts the pulse-based person count accordingly and, in some examples, marks the pulse-based person count as adjusted by the check or verification provided by the thermal imaging device 205. An example implementation of the example person detector 200 of FIG. 2 is disclosed below in connection with FIGS. 3 and 4.

The example person detector 200 of FIG. 2 outputs, for example, calculated people counts or tallies to the example time stamper 206. In some examples, for certain periods of time the outputted people counts or tallies correspond directly to the pulse-based person count, while for other periods of time the outputted people counts or tallies correspond to an adjusted pulse-based person count that has been adjusted according to the data provided by the thermal imaging device 205. The time stamper 206 of the illustrated example includes a clock and a calendar. The example time stamper 206 associates a time period (e.g., 1:00 a.m. Central Standard Time (CST) to 1:01 a.m. CST) and date (e.g., Jan. 1, 2014) with each calculated people count by, for example, appending the period of time and date information to an end of the people data. In some examples, the time stamper 206 applies a single time and date rather than a period of time. A data package (e.g., the people count, the time stamp, the image data, etc.) is stored in memory 208 of the meter 104. The example memory 208 of FIG. 2 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 208 of FIG. 2 may also include one or more mass storage devices such as, for example, hard drive disk(s), compact disk drive(s), digital versatile disk drive(s), etc. When the example meter 104 is integrated into, for example, a video game system or a set-top box, the meter 104 may utilize memory of the video game system or the set-top box to store information such as, for example, the people counts, the image data, etc.

The example time stamper 206 of FIG. 2 also receives data from an example media detector 210 of the example meter 104. The example media detector 210 of FIG. 2 detects presentation(s) of media in the media exposure environment 100 and/or collects identification information associated with the detected presentation(s). For example, the media detector 210 of FIG. 2, which may be in wired and/or wireless communication with the information presentation device 102 (e.g., a television), a video game system deployed in the environment 100, an STB associated with the information presentation device 102, and/or any other component of FIG. 1, can identify a presentation time and/or a source of a presentation. The presentation time and the source identification data (e.g., channel identification data) may be utilized to identify the program by, for example, cross-referencing a program guide configured, for example, as a look up table. In such instances, the source identification data is, for example, the identity of a channel (e.g., obtained by monitoring a tuner of an STB or a digital selection made via a remote control signal) currently being presented on the information presentation device 102.

Additionally or alternatively, the example media detector 210 of FIG. 2 can identify the presentation by detecting codes and/or watermarks embedded with or otherwise conveyed (e.g., broadcast) with media being presented via an STB and/or the information presentation device 102. As used herein, a code is an identifier that is transmitted with the media for the purpose of identifying (e.g., an audience measurement code) and/or for tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example of FIG. 2, the media detector 210 extracts the code(s) from the media. In other examples, the media detector may collect samples of the media and export the samples to a remote site for detection of the code(s).

Additionally or alternatively, the example media detector 210 of FIG. 2 can collect a signature to identify the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 210. Additionally or alternatively, the example media detector 210 of FIG. 2 collects samples of the media and exports the samples to a remote site for generation of the signature(s). In the example of FIG. 2, irrespective of the manner in which the media of the presentation is identified (e.g., based on tuning data, metadata, codes, watermarks, and/or signatures), the media identification information is time stamped by the time stamper 206 and stored in the memory 208.

In the illustrated example of FIG. 2, an output device 212 periodically and/or aperiodically exports the people information and/or the media identification information from the memory 208 to a data collection facility 214 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 104 utilizes the communication capabilities (e.g., network connections) of a video game system and/or a set-top box to convey information to, for example, the data collection facility 214. In the illustrated example of FIG. 2, the data collection facility 214 is managed and/or owned by an audience measurement entity (e.g., The Nielsen Company (US), LLC). The audience measurement entity associated with the example data collection facility 214 of FIG. 2 utilizes the people tallies generated by the person detector 200 in conjunction with the media identifying data collected by the media detector 210 to generate exposure information. The information from many panelist locations may be collected and analyzed to generate ratings representative of media exposure by one or more populations of interest.

While an example manner of implementing the meter 104 of FIG. 1 is illustrated in FIG. 2, one or more of the elements, processes and/or devices illustrated in FIG. 2 may be combined, divided, re-arranged, omitted, eliminated and/or implemented in any other way. Further, the example person detector 200, the light sensor array 202, the example image capturing device 204, the example time stamper 206, the example media detector 210, the example output device 212, and/or, more generally, the example meter 104 of FIG. 2 may be implemented by hardware, software, firmware and/or any combination of hardware, software and/or firmware. Thus, for example, any of the example person detector 200, the light sensor array 202, the example image capturing device 204, the example time stamper 206, the example media detector 210, the example output device 212, and/or, more generally, the example meter 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example person detector 200, the light sensor array 202, the example image capturing device 204, the example time stamper 206, the example media detector 210, the example output device 212, and/or, more generally, the example meter 104 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 104 of FIG. 2 may include one or more elements, processes and/or devices in addition to, or instead of, those illustrated in FIG. 2, and/or may include more than one of any or all of the illustrated elements, processes and devices.

Figure 3:
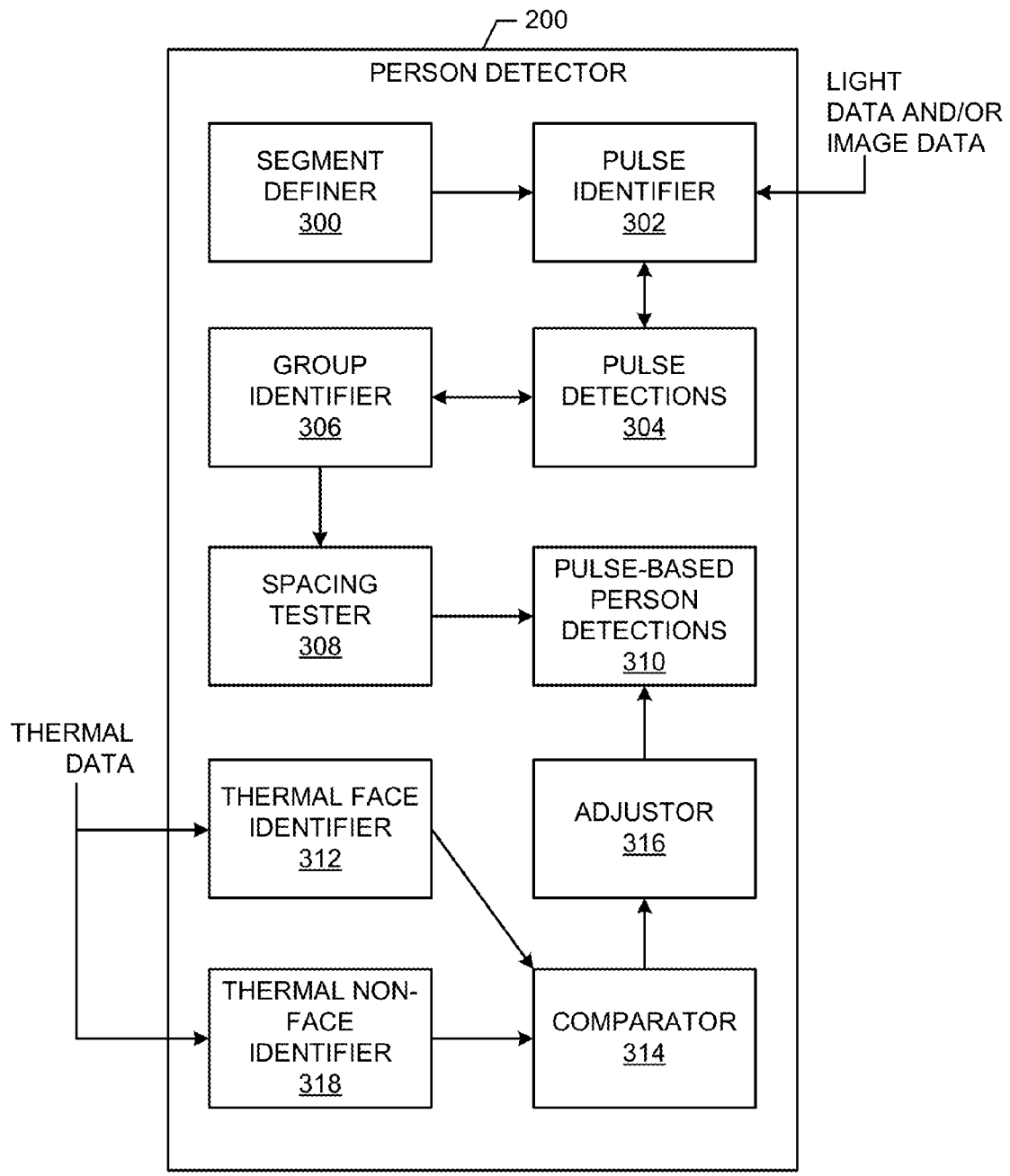
FIG. 3 is a block diagram of an example implementation of the example person detector of FIG. 2.

FIG. 3 illustrates an example implementation of the example person detector 200 of FIG. 2. The example person detector 200 of FIG. 3 includes a segment definer 300 to define a plurality of segments each corresponding to a portion of the monitored area of the example media exposure environment 100. In the illustrated example of FIG. 3, the segment definer 300 is programmable by, for example, an administrator or configuration personnel associated with the example meter 104 (e.g., a programmer of the audience measurement entity associated with the example data collection facility 214 of FIG. 2). The example segment definer 300 of FIG. 3 defines a number and size of the segments. In some examples, one or more of the segments defined by the example segment definer 300 differ in size (e.g., width). In some examples, the segments defined by the example segment definer 300 are the same size.

FIG. 4 illustrates an example segmentation 400 of the monitored area of the example media exposure environment 100 of FIG. 1 implemented by the example segment definer 300 of FIG. 3. The example segmentation 400 of FIG. 4 includes a plurality of segments 402a-402zz having the same width. In the illustrated example, when the example person detector 200 of FIG. 3 is using light information provided by the example light sensor array 202 of FIG. 2 to detect a human pulse, the example segment definer 300 of FIG. 3 defines each of the segments to correspond to one of or a group of the sensors of the array 300. In the illustrated example, when the example person detector 200 of FIG. 3 is using light information extracted from image data provided by the example image capturing device 204 to detect a human pulse, the example segment definer 300 of FIG. 3 defines each of the segments based on, for example, a resolution of the image capturing device 204. For example, when the image capturing device 204 captures images of a first resolution, the example segment definer 300 of FIG. 3 defines a first number of segments of a first size. When the image capturing device 204 captures images of a second resolution greater than the first resolution, the example segment definer 300 of FIG. 3 defines a second number of segments greater than the first number of segments of a second size less than the first size.

The example person detector 200 of FIG. 3 includes a pulse identifier 302 that analyzes obtained light information (e.g., brightness value sequences provided by the light sensor array 202 or brightness value sequences extracted from image data provided by the image capturing device 204) for the segments defined by the example segment definer 300 to determine whether the light information over a period of time is indicative of a human pulse. The example pulse identifier 302 of FIG. 3 takes advantage of changes in human skin that result from pulse-driven blood flow. That is, as blood flows through a person, light information associated with the skin of the person, especially the skin of a face, varies over time in accordance with a pulse of the person. For example, a brightness value associated with the face of person detected by, for example, one of the sensors of the light sensor array 202 of FIG. 2, may vary in a repeated fashion corresponding to the person's pulse rate. The example pulse identifier 302 of FIG. 3 analyzes the obtained light information to detect occurrences of repeated variations or patterned shapes in brightness values. In some examples, when the pulse identifier 302 detects a pattern in the light information, the example pulse identifier 302 determines whether the pattern is similar (e.g., within a threshold similarity) to a human pulse pattern in terms of, for example, beats per minute. Human beings typically have pulses that fall within a range of expected rates (e.g., beats per minute), especially when people are at rest. Thus, the example pulse identifier 302 of FIG. 3 looks for patterns corresponding to typical, expected pulse rates (e.g., within a range of expected pulse rates of persons exposed to media). In some examples, the pulse identifier 302 of FIG. 3 compares detected patterns in the light information to reference patterns that are known to correspond to a human pulse. In some examples, the pulse identifier 302 utilizes one or more filters and/or processing techniques to eliminate brightness variations resulting from non-pulse sources such as, for example, a display of the information presentation device 102.

When the example pulse identifier 302 of FIG. 3 detects a pattern indicative of a human pulse, the example pulse identifier 302 stores the corresponding information in a collection of pulse detections 304. The example pulse detections 304 are stored in any suitable data structure such as, for example, a database. In the illustrated example of FIG. 3, each of the example pulse detections 304 includes data indicative of, for example, the beats per minute, an identifier of the segment in which the pulse was detected, brightness values detected over the period of time, a maximum brightness value for the period of time, a minimum brightness value for the period of time, an average difference between peaks of the detected pattern, a time stamp associated with the period of time over which the pulse pattern was detected, and/or any other suitable information.

The example person detector 200 of FIG. 3 includes a group identifier 306 to identify one or more groups of proximate pulse-indicative segments that have similar light variation patterns. As the segments used by the example person detector 200 typically have a width much smaller than the width of a normal human face, the example group identifier 306 of FIG. 3 detects groupings of the segments within a threshold distance from each other having one or more similar characteristics (e.g., beats per minute, maximum brightness value, minimum brightness value, average differences in brightness peaks and valleys, etc.). The example group identifier 306 thus determines whether a threshold number of neighboring or proximate pulse-indicative segments include similar characteristics with respect to the pulse information stored in the corresponding ones of the pulse detections 304 of FIG. 3. In some examples, the threshold number of proximate pulse-indicative segments having similar characteristic(s) is adjustable and corresponds to an expected number of segments that would correspond to a body, human face, or another body part (e.g., depending on the size of the segments defined by the example segment definer 300). In some examples, the example group identifier 306 requires the proximate segments to have pulses that are in synchronization to conclude that the corresponding pulse belongs to the same person. That is, if the detected pulses in different segments belong to the same person, those pulses are synchronized. Therefore, the example group identifier 306 compares the timing information of the pulse detections 304 to determine whether the corresponding pulses exhibit synchronicity. If the example group identifier 306 of FIG. 3 identifies at least a threshold number of neighboring or proximate segments including a pulse pattern having similar characteristic(s) (e.g., beats per minute) and exhibiting synchronicity, the example group identifier 306 designates those segments as corresponding to a person.

Example identifications made by the example group identifier 306 of FIG. 3 are shown in FIG. 4. In the illustrated example, the example pulse identifier 302 has detected a first pulse-indicative pattern 404 of light information in a first plurality of the segments 406. The example group identifier 306 of FIG. 3 has determined that the first plurality of segments 406 have similar light characteristics such as, for example, the beats per minute of the first example pattern 404. Thus, the example group identifier 306 determines that a first person is in the environment 100 at a location associated with the first plurality of segments. The example group identifier 306 of FIG. 3 makes similar determinations and identifications in connection with second, third and fourth detected pulse patterns 408-412 and corresponding second, third and fourth pluralities of segments 414-418.

The example person detector 200 of FIG. 3 includes a spacing tester 308 to check the identifications generated by the example group identifier 306 for one or more spacing requirements. For example, two people located close together may have similar pulse patterns in sync that the group identifier 306 may mistake for a single person. While instances of two different people having similar pulse patterns, as well as having synchronized pulse patterns are rare, the example spacing tester 308 of FIG. 3 determines whether such a circumstance exists. To do so, the example spacing tester 308 of FIG. 3 determines if the number of segments belonging to a single group identified by the example group identifier exceeds a threshold. In the illustrated example, the threshold applied by the example spacing tester 308 corresponds to a number of segments unlikely to correspond to only a single human face. The number of segments in the threshold utilized by the example spacing tester 308 is, for example, a function (e.g., a percentage, such as five percent) of a total number of segments defined by the segment definer 300. The number of segments in the threshold utilized by the example spacing tester 308 may be determined and/or expressed in any additional or alternative manner (e.g., selected based on a distance between an expected person detection area and the light sensor array 202 and/or the image capturing device 204). When a group identification generated by the example group identifier 306 of FIG. 3 includes a number of segments in excess of the threshold applied by the example spacing tester 308, the example spacing tester 308 causes the single group identification to be broken or split into two separate group identifications. When a group identification generated by the example group identifier 306 of FIG. 3 includes a number of segments below the threshold applied by the example spacing tester 308, the single group identification is confirmed as indicative of one person. Each of the detections confirmed by the example spacing tester 308 is stored as a pulse-based person detection 310. Any suitable information associated with the individual pulse-based person detections 310 is stored in connection with the pulse-based detections 310 including, for example, a time stamp, the corresponding light information, the corresponding pulse pattern, etc. In the illustrated example of FIG. 2, the stored information includes coordinates indicative of a location in the environment 100 at which the corresponding pulse-based person detection occurred. The coordinate information includes, for example, which of the segments defined by the example segment definer 300 were part of the corresponding pulse-based person detection. Ones of the example pulse-based person detections 310 of FIG. 3 captured during a same period of time (e.g., according to a time stamp) can be added together to generate a pulse-based person count.

The example person detector 200 of FIG. 2 includes a thermal face identifier 312, a comparator 314, an adjustor 316, and a thermal non-face identifier 318 to perform a check or verification on the example pulse-based detections 310. In some examples, the thermal verification on the example pulse-based detections 310 is performed periodically (e.g., in response to a timer. Additionally or alternatively, the thermal verification may be performed aperiodically (e.g.,in response to an event in the environment 100, such as a change in the pulse-based person count (e.g., due to a person leaving or entering the environment 100)). Alternatively, the example person detector 200 of FIG. 2 can be set to omit or forego the thermal verification of the pulse-based person detections 310.

Figure 5:
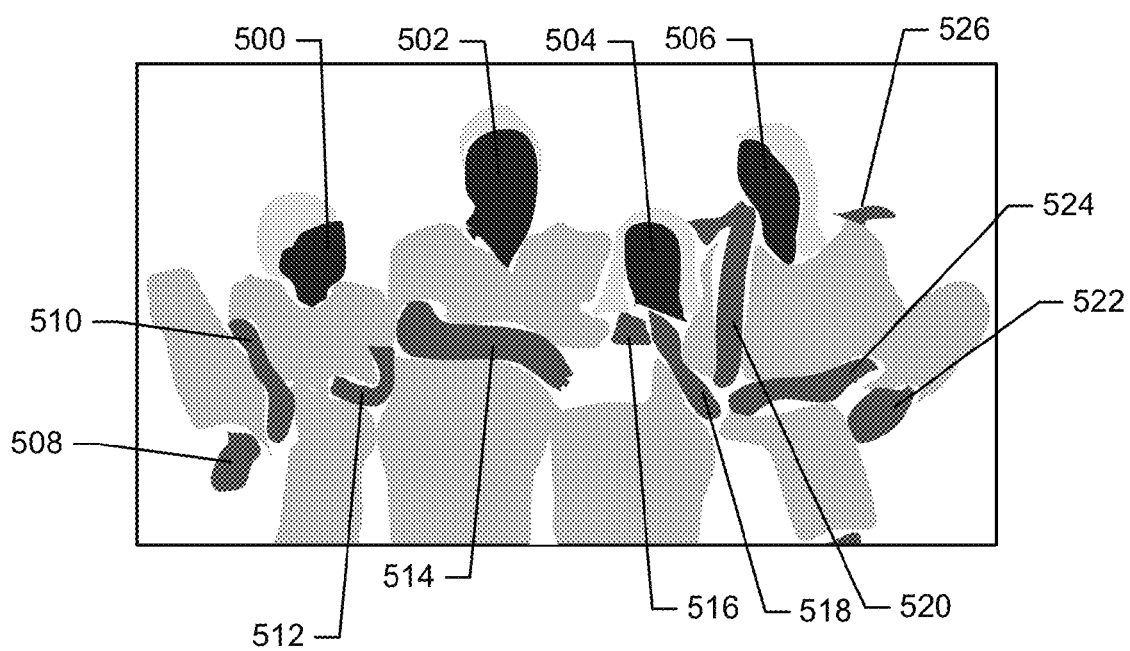
FIG. 5 is an illustration of an example thermal image captured by the example meter of FIGS. 1 and/or 2.

The example thermal face identifier 312 of FIG. 3 utilizes data provided by the example thermal imaging device 205 to detect human faces in the environment 100. A typical (e.g., healthy) person has a temperature on the surface of their face above a particular temperature (e.g., above thirty-four degrees Celsius) or within a particular temperature range (e.g., between 34 degrees Celsius and 37 degrees Celsius). The example thermal face identifier 312 of FIG. 3 analyzes the thermal images to determine locations in the environment 100 corresponding to the particular temperature. FIG. 5 is an illustration of a thermal image provided by the example thermal imaging device 205 of FIG. 2 corresponding to the example of FIG. 4. In the example of FIG. 5, the thermal face identifier 312 detects first, second, third and fourth faces 500-506, respectively, due to the high temperature readings at the corresponding locations relative to the remainder of image.

The example comparator 314 of FIG. 3 receives location data associated with the thermally-detected faces 500-506 and compares the received information with the location data associated with individual one(s) of the pulse-based person detections 310. In the illustrated example, the location data associated with the individual ones of the thermally-detected faces 500-506 includes a coordinate (e.g., an X-Y coordinate). As the pulse-based person detections 310 have locations corresponding to the vertical segments defined by the segment definer 200, the example comparator 314 uses the horizontal component of the coordinate (e.g., the X-component) of the thermally-detected faces 500-506 when comparing the locations of the pulse-based person detections 310 and the thermally-detected faces 500-506. That is, the example comparator 314 of FIG. 3 determines whether each of the locations of the pulse-based person detections 310 has a counterpart thermally-detected face. If the example comparator 314 of FIG. 3 determines that each of the locations of the pulse-based person detections 310 match (e.g., with a threshold) one of the locations of the thermally-detected faces 500-506 (i.e., one-for-one correspondence), the example adjustor 316 does not adjust the pulse-based detections 310. Rather, the example adjustor 316 designates the pulse-based detections 310 as verified. In some examples, if the comparator 314 determines that a mismatch exits between the number of thermally-detected faces 500-506 and the number of the example pulse-based detections 310, the example adjustor 316 either marks mismatching one(s) of the pulse-based person detections 310 as unverified or eliminates (e.g., discards or deletes) the mismatching one(s) of the pulse-based person detections 310. Additionally or alternatively, the example adjustor 316 can increment the pulse-based person count when the thermally-detected faces 500-506 include a face not present in the example pulse-based person detections 310.

The example thermal non-face identifier 318 of FIG. 2 utilizes data provided by the example thermal imaging device 205 to detect non-face body parts in the environment 100. The one or more of the pulse-based person detections 310 may have been based on a non-face body part and, thus, may have skewed the stored pulse-based person count. A typical (e.g., healthy) person has a temperature on the surface of their non-face body parts above a particular temperature (e.g., 31 degrees Celsius) but less than the corresponding face temperature (e.g., 34 degrees Celsius). The example thermal non-face identifier 318 of FIG. 3 analyzes the thermal images to determine locations in the environment 100 corresponding to the non-face temperature(s) (e.g., between 30 degrees Celsius and 33 degrees Celsius). In the example of FIG. 5, the example thermal non-face identifier 318 detects a plurality of non-face body parts 508-526.

The example comparator 314 of FIG. 3 receives location data associated with the thermally-detected non-face body parts 508-526 and compares the received information with the location data associated with individual one(s) of the pulse-based person detections 310. In the illustrated example, the location data associated with the individual ones of the thermally-detected non-face body parts 508-526 includes a coordinate (e.g., an X-Y coordinate). As the pulse-based person detections 310 have locations corresponding to the vertical segments defined by the segment definer 200, the example comparator 314 uses the horizontal component of the coordinate (e.g., the X-component) of the thermally-detected non-face body parts 508-526 when comparing the locations of the pulse-based person detections 310 and the thermally-detected faces 500-506. The example comparator 314 of FIG. 3 determines whether any of the locations of the pulse-based person detections 310 correspond to the location of any of the thermally-detected non-face body parts 508-526. The example comparator 314 of FIG. 3 determining that the location of one of the pulse-based person detections 310 substantially matches (e.g., with a threshold (e.g., plus or minus one-tenth of a degree) the location of one of the thermally-detected non-face body parts 508-526 may indicate that the pulse identifier 302 mistook a non-face body part for a face. However, because a vertical segment of the environment 100 may include a face and a non-face body part (e.g., the face 502 and the non-face body part 514 of FIG. 5), the example comparator 314 references the thermally-detected faces 500-508 to determine whether a thermally-detected face is also at that location. If no thermally-detected face is present at the shared location of the pulse-based person detection 310 and the thermally-detected non-face body part, the example adjustor 316 discards the corresponding one(s) of the pulse-based person detections 310. Thus, in the example of FIG. 3, the example thermal face identifier 312, the example comparator 314, the example adjustor 316, and the example thermal non-face identifier 318 cooperate to make one or more adjustments to the example pulse-based person detections 310 to determine people counts for respective periods of time.

In the illustrated example of FIG. 3, the example person detector 200 outputs a number of distinct group identifications as a detected number of people for the corresponding period of time. For example, the example person detector 200 of FIG. 3 sends the detected number of people to the example time stamper 206 of FIG. 2. In some instances, when the thermal verification is not performed, the output people count corresponds directly to the pulse-based person count of the pulse-based person detections 310. In some instances, the output people count corresponds to the pulse-based person count of the pulse-based person detections 310 as adjusted by the example adjustor 316.

While an example manner of implementing the person detector 200 of FIG. 2 is illustrated in FIG. 3, one or more of the elements, processes and/or devices illustrated in FIG. 3 may be combined, divided, re-arranged, omitted, eliminated and/or implemented in any other way. Further, the example segment definer 300, the example pulse identifier 302, the example group identifier 306, the example spacing tester 308, the example thermal face identifier 312, the example comparator 314, the example adjustor 316, the example thermal non-face identifier 318, and/or, more generally, the example person detector 200 of FIG. 3 may be implemented by hardware, software, firmware and/or any combination of hardware, software and/or firmware. Thus, for example, any of the example segment definer 300, the example pulse identifier 302, the example group identifier 306, the example spacing tester 308, the example thermal face identifier 312, the example comparator 314, the example adjustor 316, the example thermal non-face identifier 318, and/or, more generally, the example person detector 200 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, segment definer 300, the example pulse identifier 302, the example group identifier 306, the example spacing tester 308, the example thermal face identifier 312, the example comparator 314, the example adjustor 316, the example thermal non-face identifier 318, and/or, more generally, the example person detector 200 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example person detector of FIG. 2 may include one or more elements, processes and/or devices in addition to, or instead of, those illustrated in FIG. 3, and/or may include more than one of any or all of the illustrated elements, processes and devices.

Figure 6:
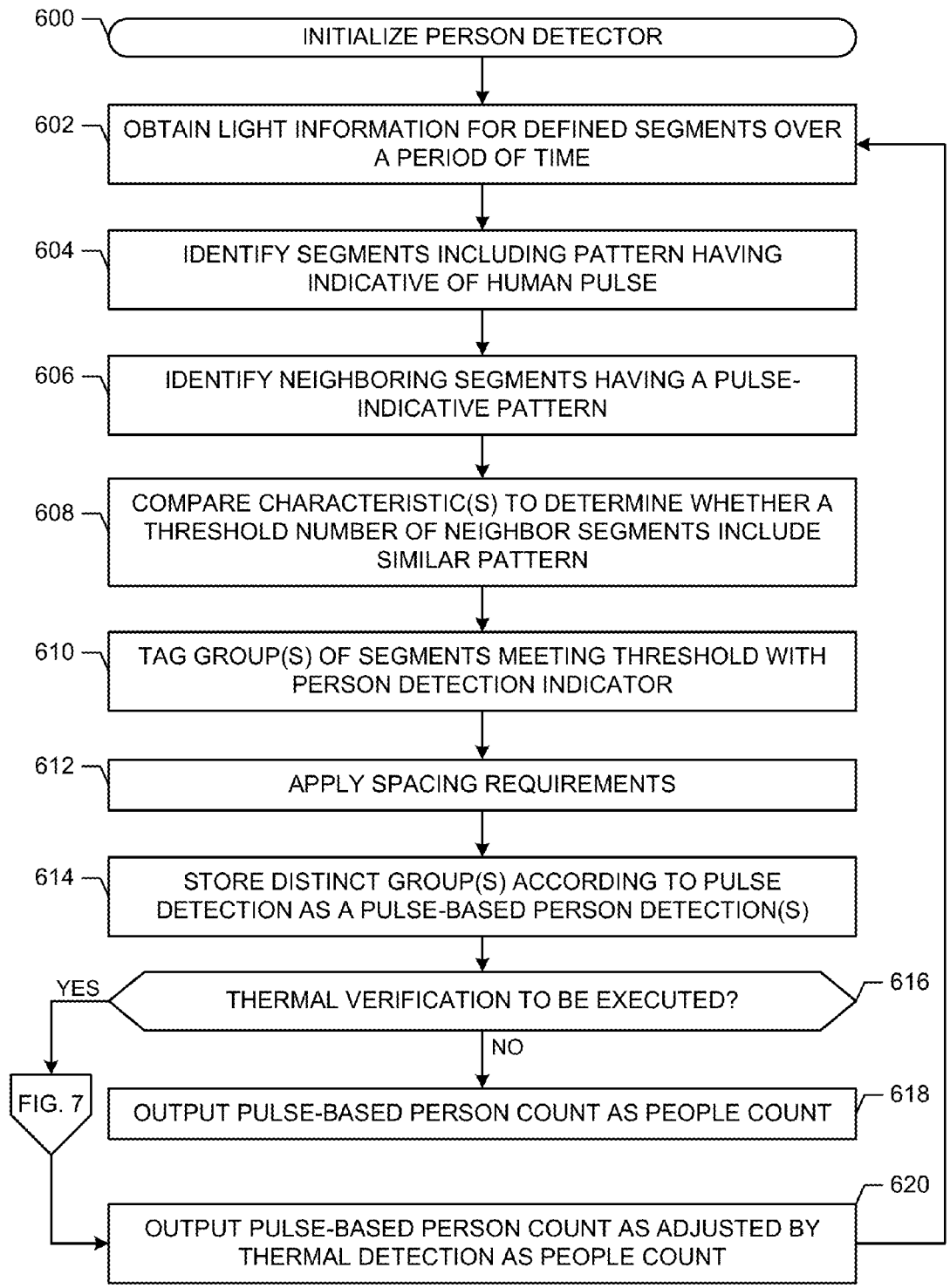
FIG. 6 is a flowchart representative of example machine readable instructions that may be executed to implement the example person detector of FIGS. 2 and/or 3.
Figure 7:
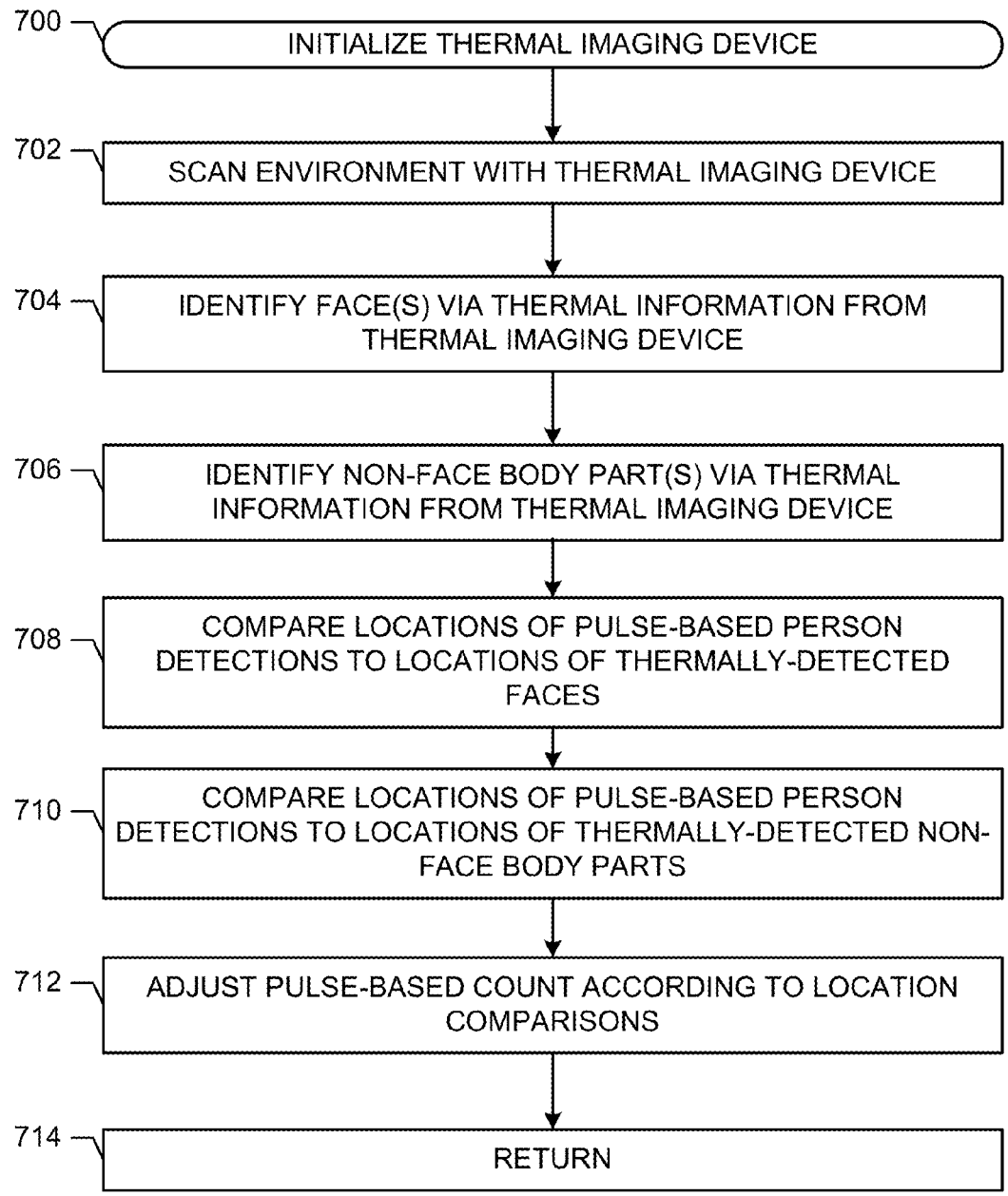
FIG. 7 is a flowchart representative of example machine readable instructions that may be executed to implement the example person detector of FIGS. 2 and/or 3.

Flowcharts representative of example machine readable instructions for implementing the example person detector 200 of FIGS. 2 and/or 3 are shown in FIGS. 6 and 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 6 and 7, many other methods of implementing the example person detector 200 of FIGS. 2 and/or 3 may alternatively be used. For example, the order of execution of the blocks may be changed, and/or some of the blocks described may be changed, eliminated, or combined.

As mentioned above, the example processes of FIGS. 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 6 begins at block 600 with an initialization of the example person detector 200 of FIGS. 2 and/or 3 (block 600). In the illustrated example, the person detector 200 is initialized and/or remains active when the example media detector 210 of FIG. 2 determines that media is being presented in the example media exposure environment 100 of FIG. 1. In some examples, the person detector 200 is initialized and/or remains active when the example information presentation device 102 is turned on. In some examples, the person detector 200 remains on irrespective of whether media is being presented. To monitor a portion of the example media exposure environment 100, the example person detector 200 obtains light information representative of the portion of the media exposure environment 100 (block 602). In the illustrated example, the light information utilized by the example person detector 200 includes light information provided by the example light sensor array 202 of FIG. 2 (e.g., aggregate brightness values for individual ones of the segments) and/or light information provided by the example image capturing device 204 of FIG. 2 (e.g., brightness values extracted from two-dimensional image data). In the illustrated example, the person detector 200 obtains light information for each of the plurality of segments defined by the example segment definer 300 of FIG. 3. The example pulse identifier 302 of FIG. 3 analyzes the light information associated with individual ones of the segments to determine whether the light information of any of the segments includes a pulse-indicative pattern (block 604). For example, the pulse identifier 302 determines whether a pattern is found in the light information corresponding to a repetitive brightness variance on skin of a person resulting from pulse-driven blood flow. If a pulse-indicative pattern is detected in a segment by the pulse identifier 302 (block 604), the example pulse identifier 302 determines that the particular segment is a candidate indicator of a person being present at a location in the media exposure environment 100 associated with the particular segment. The example pulse identifier 302 records the information associated with the identification of the pulse-indicative pattern in the pulse detections 304.

The example group identifier 306 of FIG. 3 analyzes the pulse detections 304 for a period of time to identify neighboring or proximate (e.g., within a threshold distance from each other) segments having a pulse-indicative pattern (block 606). Further, the example group identifier 306 determines whether a same or similar pulse-indicative pattern was detected in a threshold number of the neighboring or proximate segments (block 608). Finding a grouping of segments including synchronized, similar pulse-indicative patterns is an indication of a person being present in the media exposure environment 100. In some examples, one or more characteristics (e.g., beats per minute, brightness value(s), etc.) of the pulse-indicative patterns detected in neighboring or proximate segments are compared to each other and a similarity is detected when the characteristic(s) are within a threshold (e.g., percentage) similarity. The groups of segments having similar characteristic(s) are tagged as indicative of the presence of a person (block 610).

In the illustrated example, the spacing tester 308 of FIG. 3 applies one or more spacing requirements to the identified groups of segments to determine whether any of the group(s) exceeds a threshold (block 612). For example, the spacing requirement(s) include a threshold span that a group may have to account for instances in which two people are detected as one person by the example group identifier 306. If a group of segments does not meet the spacing requirements, the example spacing tester 308 splits the violating group into two person indications. The example spacing tester 308 stores each of the distinct groups as a pulse-based person detection 310 for the corresponding period of time (block 614).

In the example of FIG. 6, the person detector 200 determines whether the thermal verification is to be executed (block 616). In some examples, the person detector 200 maintains a schedule for the thermal verification. Additionally or alternatively, the thermal verification is to be executed when a change is detected in the environment 100 according to, for example, the pulse-based person count. If the thermal verification is not to be executed (block 616), the example person detector 200 outputs the sum of the pulse-based person detections 310 for the current period of time as the people count for the current period of time (block 618). If the thermal verification is to be executed (block 616), control passes to FIG. 7 which is described below. As the thermal verification may result in an adjustment to the pulse-based person detections 310, the example person detector 200 outputs the pulse-based person count as adjusted (if any) by the example adjuster 316 of FIG. 3 (block 620). Control passes to block 602 where light information for another period of time is obtained.

FIG. 7 begins with initialization of the thermal imaging device 205 in response to the example person detector 200 determining that the thermal verification of the pulse-based person count is to be executed (block 700). In the example of FIG. 7, the thermal imaging device 205 captures a thermal image of the environment 100 (block 702). The example thermal imaging device 205 detects temperatures of surfaces in the environment to generate the thermal image, such as the example thermal image of FIG. 5. In the illustrated example, the resolution of the thermal imaging device 205 is great enough to distinguish between a face and a non-face body part that is typically cooler at the surface than a face.

In the example of FIG. 7, the thermal face identifier 312 of FIG. 3 identifies location(s) in the thermal image that include a face (block 704). For example, the thermal face identifier 312 determines which location(s) in the thermal image indicate that a surface having a typical temperature of a human face is present. Further, in the example of FIG. 7, the thermal non-face identifier 318 identifies location(s) in the thermal image that include a non-face body part (block 706). For example, the thermal non-face identifier 318 determines which location(s) in the thermal image indicate that a surface having a typical temperature of a human non-face body part is present. The typical temperature of a surface of a non-face body part is lower than a temperature of a surface of a face. The example thermal face identifier 312 and the example thermal non-face identifier 318 distinguish between the face(s) and the non-face body part(s) and store information associated with each, such as a location and temperature data.

In the example of FIG. 7, the comparator 314 of the person detector 200 uses the thermally-detected faces (e.g., the faces 500-506 of FIG. 5) to verify the pulse-based person detections 310 (block 708). For example, the comparator 314 compares the locations of the faces detected by the thermal face identifier 312 to the locations of the pulse-based person detections 310. If one of the pulse-based person detections 310 corresponds to one of the locations of the thermally-detected faces, that one of the pulse-based person detections 310 is verified as accurate. Additionally or alternatively, if one of the pulse-based person detections 310 does not correspond with one of the locations of the thermally-detected faces, that one of the pulse-based person detections 310 is, for example, marked as unverified (e.g., still included in the pulse-based person count but differently marked or categorized). Alternatively, in some examples, the pulse-based person detection(s) 310 not corresponding to any of the locations of the thermally-detected faces is discarded (e.g., no longer included in the pulse-based person count). Additionally or alternatively, if the location of a thermally-detected face does not correspond to any of the pulse-based person detections 310, the pulse-based person count is incremented to account for the face missed by the pulse identifier 302, the group identifier 306, and/or the spacing tester 308. If more than one face is so missed the count is incremented accordingly to account for each missed face.

In the example of FIG. 7, the comparator 314 of the person detector 200 uses the thermally-detected non-face body parts (e.g., the non-face body parts 508-526 of FIG. 5) to identify false positives in the pulse-based person detections 310 (block 710). Under certain circumstances, the example pulse-identifier 302 may mistake a non-face body part (e.g., a hand) as a face. As discussed above, the example thermal non-face identifier 318 identifies locations in the environment 100 corresponding to a non-face body part. Thus, the example comparator 314 determines whether any of the locations of the pulse-based person detections 310 correspond to any of the locations of the thermally-detected non-face body parts. Further, to account for instances in which a segment of the environment 100 (e.g., a vertical segment) includes a thermally-detected face and a thermally-detected non-face body part, the comparator 314 references the thermally-detected face locations to determine whether the pulse-based person detection 310 should not be discarded. That is, if the location of the pulse-based person detection 310 corresponds to the location of a thermally-detected non-face body part and the location of a thermally-detected face, that pulse-based person detection 310 is not discarded. On the other hand, those of the pulse-based person detections 310 having a location corresponding to one of the thermally-detected non-face body parts and not one of the thermally-detected faces are discarded as false positives.

In the example of FIG. 7, the adjuster 316 makes the adjustments (e.g., verifications, discards, increments, etc.) to the pulse-based person detections based on the thermal imaging detections (block 712). The result of the adjustments at block 712 form the adjusted pulse-based person count of block 620 of FIG. 6. Control then returns to FIG. 6 (block 714).

Figure 8:
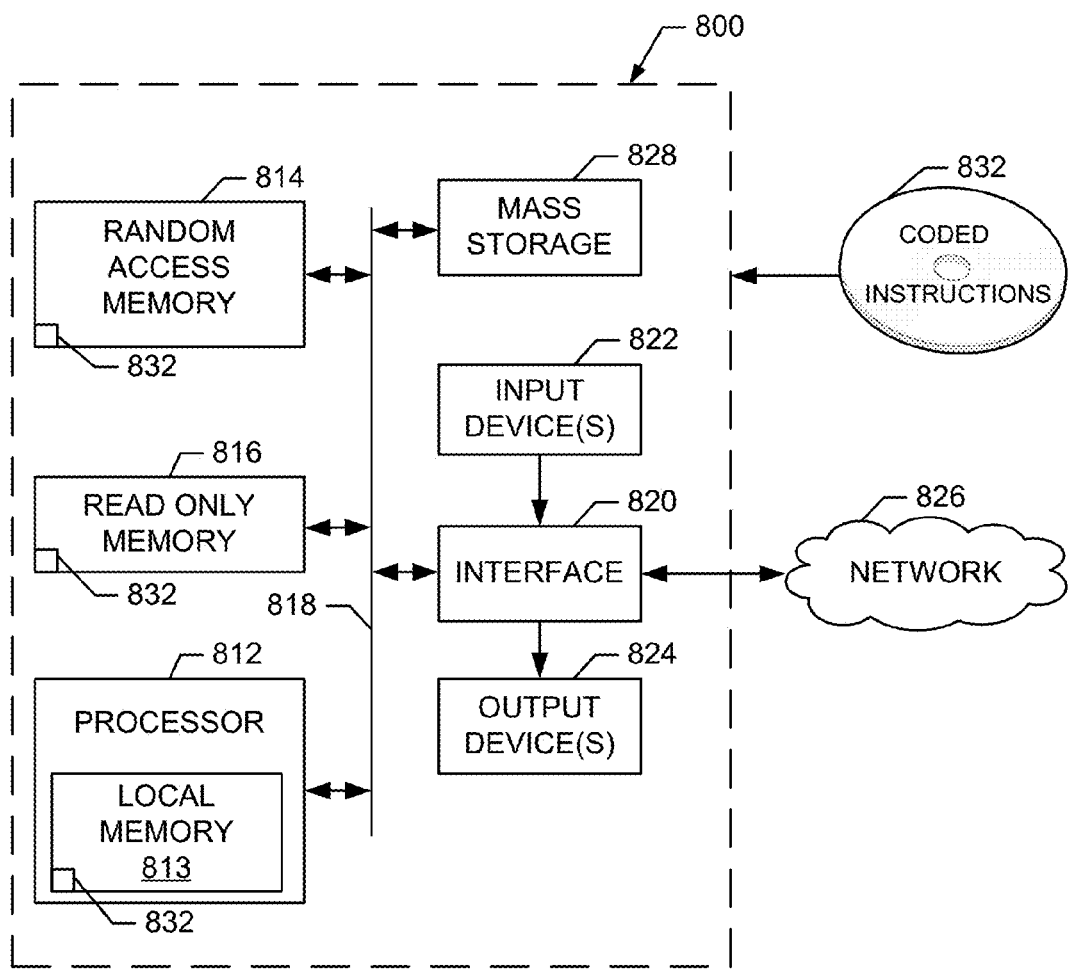
FIG. 8 is a block diagram of an example processing system capable of executing the example machine readable instructions of FIGS. 5 and/or 6 to implement the example person detector of FIGS. 2 and/or 3.

FIG. 8 is a block diagram of an example processor platform 800 capable of executing the instructions of FIGS. 6 and/or 7 to implement the person detector 200 of FIGS. 2 and/or 3. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6 and/or 7 may be stored in the mass storage device 828, in the volatile memory 814, in the non-volatile memory 816, and/or on a removable tangible computer readable storage medium such as a CD or DVD.

Examples disclosed herein detect people in an environment in an efficient, accurate and private manner that avoids drawbacks of known image data recognition systems. For example, by detecting people using light information and pulse-indicative patterns in the light information, examples disclosed herein can detect people while maintaining the privacy (e.g., identity) of the person. That is, people are detected by examples disclosed herein in a less intrusive and less obtrusive manner than, for example, taking a picture of the environment. Further, light sensors (e.g., an array of light sensors) used by examples disclosed herein are inexpensive relative to certain image capturing equipment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a pulse identifier to detect a first human pulse waveform in first light information associated with a first one of a plurality of segments of an environment, the first light information obtained from a light sensor;
   a grouper to generate a first presence indication in response to respective light information associated with a threshold amount of the segments proximate the first one of the segments including the first human pulse waveform identified in the first one of the segments;
   a face identifier to identify a first location associated with a face in the environment using thermal imaging data from a thermal sensor; and
   an adjustor to adjust a people count in response to the first location associated with the face not corresponding to a second location associated with the first presence indication.

2. The apparatus as describe in claim 1, wherein the segments of the environment are vertical strips spanning across at least a portion of the environment.

3. The apparatus as describe in claim 2, wherein the second location associated with the first presence indication includes a corresponding second horizontal location along a horizontal axis, and the adjustor is to adjust the people count when the first location associated with the face has a corresponding first horizontal location along the horizontal axis that does not correspond to the second horizontal location of the first presence indication along the horizontal axis.

4. The apparatus as describe in claim 1, further including:
   a non-face identifier to identify a third location associated with a non-face body part in the environment using the thermal imaging data; and
   the adjustor is to adjust the people count in response to the third location associated with the non-face body part corresponding to the second location associated with the first presence indication.

5. The apparatus as describe in claim 4, wherein the adjuster does not adjust the people count when (A) the third location associated with the non-face body part corresponds to the second location associated with the first presence indication, and (B) the first location associated with the face corresponds to the second location associated with the first presence indication.

6. The apparatus as describe in claim 1, wherein the thermal sensor has a resolution able to detect a difference in temperature between the face and a non-face body part.

7. The apparatus as describe in claim 1, further including a time stamper to associate media identifying information collected from the environment with the people count.

8. A method, comprising:
   detecting, by executing an instruction with a processor, a first human pulse waveform in first light information associated with a first one of a plurality of segments of an environment, the first light information obtained from a light sensor;
   generating, by executing an instruction with the processor, a first presence indication when respective light information associated with a threshold amount of the segments proximate the first one of the segments includes the first human pulse waveform identified in the first one of the segments;
   identifying, by executing an instruction with the processor, a first location associated with a face in the environment using thermal imaging data from a thermal sensor; and
   adjusting, by executing an instruction with the processor, a people count when the first location associated with the face does not correspond to a second location associated with the first presence indication.

9. The method as describe in claim 8, wherein the segments of the environment are vertical strips spanning across at least a portion of the environment.

10. The method as describe in claim 9, wherein the second location associated with the first presence indication includes a corresponding second horizontal location along a horizontal axis, and the people count is adjusted when the first location associated with the face has a corresponding first horizontal location along the horizontal axis that does not correspond to the second horizontal location associated with the first presence indication along the horizontal axis.

11. The method as describe in claim 8, further including:
    identifying a third location associated with a non-face body part in the environment using the thermal imaging data; and
    adjusting the people count when the third location associated with the non-face body part corresponds to the second location associated with the first presence indication.

12. The method as describe in claim 11, wherein the people count is not adjusted when (A) the third location associated with the non-face body part corresponds to the second location associated with the first presence indication, and (B) the first location associated with the face corresponds to the second location associated with the first presence indication.

13. The method as describe in claim 8, wherein the thermal sensor has a resolution able to detect a difference in temperature between the face and a non-face body part.

14. The method as describe in claim 8, further including associating media identifying information collected from the environment with the people count.

15. A tangible computer readable storage medium comprising instructions that, when executed, cause a machine to at least:
    detect a first human pulse waveform in first light information associated with a first one of a plurality of segments of an environment, the first light information obtained from a light sensor;
    generate a first presence indication in response to respective light information associated with a threshold amount of the segments proximate the first one of the segments including the first human pulse waveform identified in the first one of the segments;
    identify a first location associated with a face in the environment using thermal imaging data from a thermal sensor; and
    adjust a people count in response to the first location associated with the face not corresponding to a second location associated with the first presence indication.

16. The storage medium as describe in claim 15, wherein the segments of the environment are vertical strips spanning across at least a portion of the environment.

17. The storage medium as describe in claim 16, wherein the second location associated with the first presence indication includes a corresponding second horizontal location along a horizontal axis, and the instructions, when executed, cause the machine to adjust the people count when the first location associated with the face has a corresponding first horizontal location along the horizontal axis that does not correspond to the second horizontal location of the first presence indication along the horizontal axis.

18. The storage medium as describe in claim 15, wherein the instructions, when executed, further cause the machine to:
  identify a third location associated with a non-face body part in the environment using the thermal imaging data; and
  adjust the people count in response to the third location associated with the non-face body part corresponding to the second location associated with the first presence indication.

19. The storage medium as describe in claim 18, wherein the people count is not adjusted when (A) the third location associated with the non-face body part corresponds to the second location associated with the first presence indication, and (B) the first location associated with the face corresponds to the second location associated with the first presence indication.

20. The storage medium as describe in claim 15, wherein the instructions, when executed, further cause the machine to associate media identifying information collected from the environment with the people count.

\* \* \* \* \*